United States Patent
Battah

(10) Patent No.: US 7,127,894 B2
(45) Date of Patent: Oct. 31, 2006

(54) SOLAR THERMAL ENERGY CONVERSION SYSTEM

(76) Inventor: Hammam Jamil Girgiess Battah, 20200 Fenton St, Detroit, MI (US) 48219

( * ) Notice: Subject to any disclaimer, the term of this patent is extended or adjusted under 35 U.S.C. 154(b) by 655 days.

(21) Appl. No.: 10/378,491

(22) Filed: Mar. 3, 2003

(65) Prior Publication Data

US 2004/0173254 A1 Sep. 9, 2004

(51) Int. Cl.
*F03G 6/00* (2006.01)
*F03G 7/05* (2006.01)

(52) U.S. Cl. ............. 60/641.8; 60/641.7; 60/641.9; 159/903; 159/904; 126/568

(58) Field of Classification Search ........... 60/641.8, 60/641.7, 641.9; 159/902–904; 126/561–714
See application file for complete search history.

(56) References Cited

U.S. PATENT DOCUMENTS 4,504,362 A * 3/1985 Kruse .................. 203/3
6,494,995 B1 * 12/2002 Battah .................. 202/234
2002/0108371 A1 * 8/2002 Rouse et al. ............ 60/611

* cited by examiner

*Primary Examiner*—Nam Nguyen
*Assistant Examiner*—Anthony Fick
(74) *Attorney, Agent, or Firm*—Thomas E. Donohue

(57) ABSTRACT

A solar cell floats over a body of saline water. A submerged fresh water collection system underlies the cell. A partial vacuum is created in the solar cell for drawing water vapor from the cell to the collection system. Water vapor is condensed in a condenser disposed between the cell and the collection system. Heat generated by the condensation of water vapor is utilized to heat the salt water, which rises upwardly to replace the salt water vaporized in the cell. The fresh water from the fresh water collection system is routed under the cell such that it becomes thermally enriched. The thermally enriched fresh water is provided to a power generator to improve efficiency.

13 Claims, 4 Drawing Sheets

SOLAR THERMAL ENERGY CONVERSION SYSTEM

TECHNICAL FIELD

The present invention relates generally to a solar energy conversion system and more particularly to a solar thermal energy conversion system for power generation.

BACKGROUND OF THE INVENTION

Solar distillation systems are known that utilize solar energy stored in sea water to assist in the production of fresh water. These systems, however, are generally directed solely at the evaporation of sea water and the subsequent condensation of fresh water. Existing systems, although fulfilling their primary design purpose, often fail to fully utilize the thermal energy trapped within their confines. In many systems, this is a reflection on the inefficiency of design for solar distillation. In other systems, however, this inefficient approach represents a failure of designers to recognize the potential of the stored energy to improve the efficiency of energy generating systems.

The concept of utilizing the thermal properties of sea water in an effort to generate energy is not novel in and of itself. Ocean Thermal Energy Conversion (OTEC) systems have been designed to take advantage of the temperature differences between the warmer ocean surface and the colder ocean depths. Existing systems, however, carry with them several disadvantages. In order for significant temperature differences to be utilized, existing systems must often be located (or have access to) offshore and are therefore exposed to the ravages of nature. This contributes significant costs and inefficiencies to these systems and often requires their location at a position distant from the potential users of the generated energy. In addition, the temperature differences typically utilized by such systems are in the magnitude of 35–36 degrees Fahrenheit. This is usually representative of a temperate surface of 77–78 degrees and a chilled depth of 42 degrees. Although considerable effort has been expelled to extract as much energy as possible from this temperature range, the potential is limited.

In addition to the thermal inefficiencies, existing OTEC systems often suffer from other disadvantages such as biofouling. Biofouling and scaling often develop when ocean water filled with biomatter is raised to temperatures between 60 degrees and 100 degrees Fahrenheit. This contributes both expense and additional inefficiencies to existing systems. Processes such as reverse osmosis can minimize the effects of biofouling, but contribute their own complexities to the systems. The problem of biofouling can exist for a wide variety of energy generating systems that attempt to utilize sea water as an active ingredient. Thus an approach to energy generation that reduced the impact of biofouling on an energy generation system utilizing sea water would be highly desirable.

Accordingly, there is a need for a cost effective energy efficient solar energy generation system that utilizes the potential for solar energy storage in sea water without the representative disadvantages associated with existing systems. In addition, there is a need for a solar energy generation system that utilizes the excess solar energy often ignored by solar distillation advances.

SUMMARY OF THE INVENTION

The solar thermal energy conversion system of the present invention stores solar energy in water in the form of heat. The system utilizes the accumulated solar generated heat as well as the heat of condensation to increase the temperature of water internally of perimeter insulation surrounding a plurality of integrated solar cells.

More specifically, the solar thermal energy conversion system of the present invention comprises multiple solar cells, the number of which is dictated by the required output of the system. The solar cells are designed so that the upper extremities thereof float above the water level. The entire system is insulated from the adjoining body of water and is designed to move up or down with the tide. System position is maintained against change in the direction of water currents and/or wind by mooring cables.

The solar energy conversion system of the present invention is different than known systems in many important respects, namely; (a) the system works day and night, during cloudy days and during the cold winter season due to the fact that heat is stored in the system. Temperatures approaching 100° C. are reached in the tipper layers under the cells after four months of operation; (b) the system can work in combination with solar distillation to produce fresh water for use in power generation and/or fresh water supplies; and, (c) the system is designed to produce huge quantities of thermally enriched water for use by power generators.

The aforesaid advantages are achieved by:

(1) Continuously heating the water to temperatures approaching the boiling point;

(2) Condensing water vapor in a collection system deep under the solar cells, for example, 40 feet;

(3) Storing heat in massive quantities at temperatures ranging from sea temperature to the boiling point of saline water;

(4) Eliminating the requirement for a heating element or condenser coil;

(5) Utilizing the heat of solar radiation plus heat of vaporization; and (6) Utilizing humid air above the installation which is drawl into the system.

DESCRIPTION OF PREFERRED EMBODIMENTS

Figure 1:
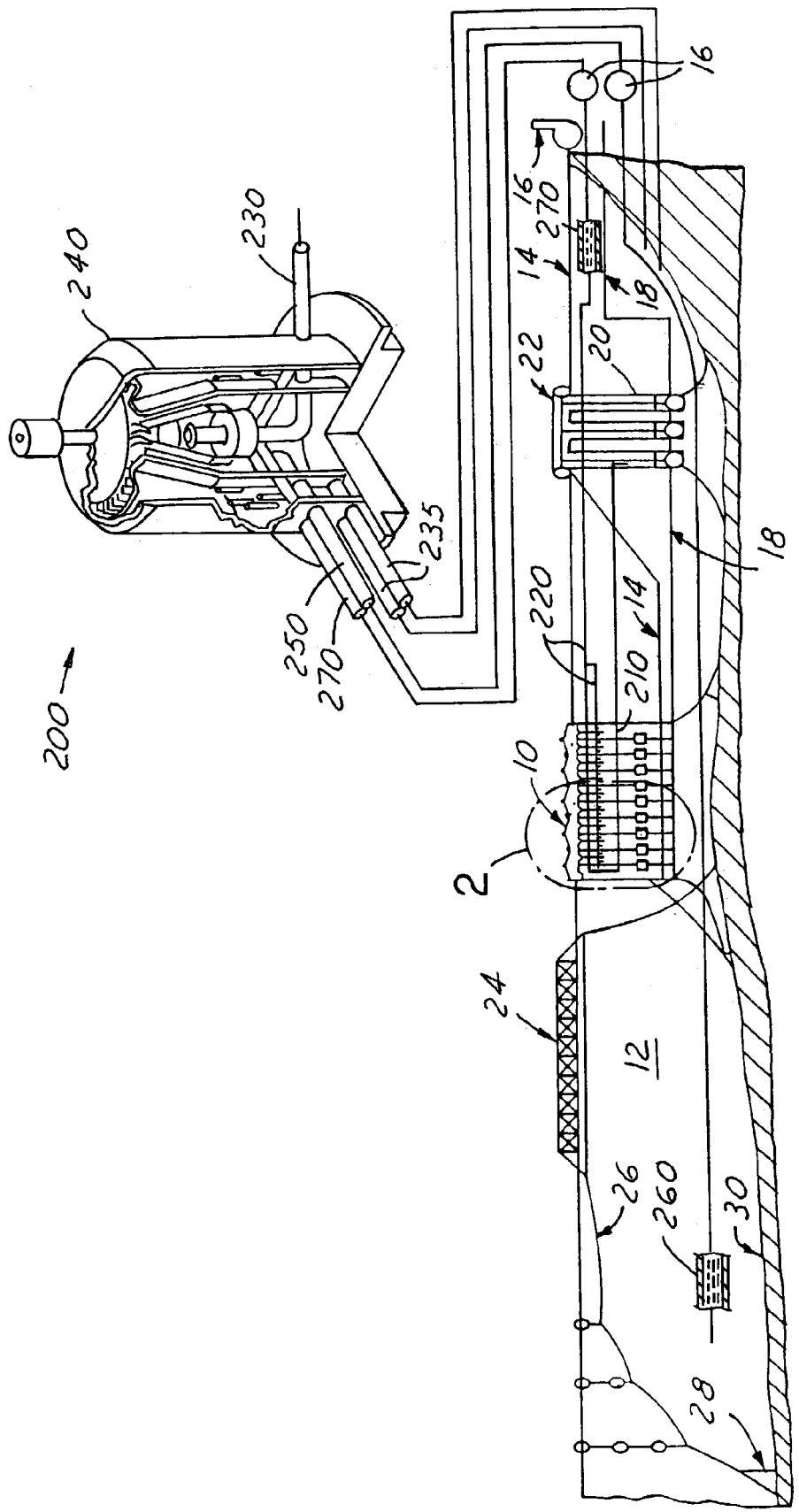
FIG. 1 is an elevation of the solar thermal energy conversion system of the present invention in its operating environment.

As seen in FIG. 1, a solar energy conversion system 8 is provided that utilizes a plurality of interconnected solar cells 10 adapted to float over a body of water 12. The body of water 12 may represent salt water or fresh water. Additionally, although the body of water 12 is contemplated to encompass any water mass either natural or man-made, the body of water 12 is preferably one located in a position between ±37 latitudes wherein the energy storage potential of the solar energy conversion system 8 can be fully utilized. When the solar thermal energy conversion system 8 is deployed over a body of water 12 that is subject to wave action, a wave breaker 24 may be employed to protect the solar cells 10 from the waves. Suitable cables 26 and anchors 28 position the system 8 relative to the sea bed 30.

Figure 2:
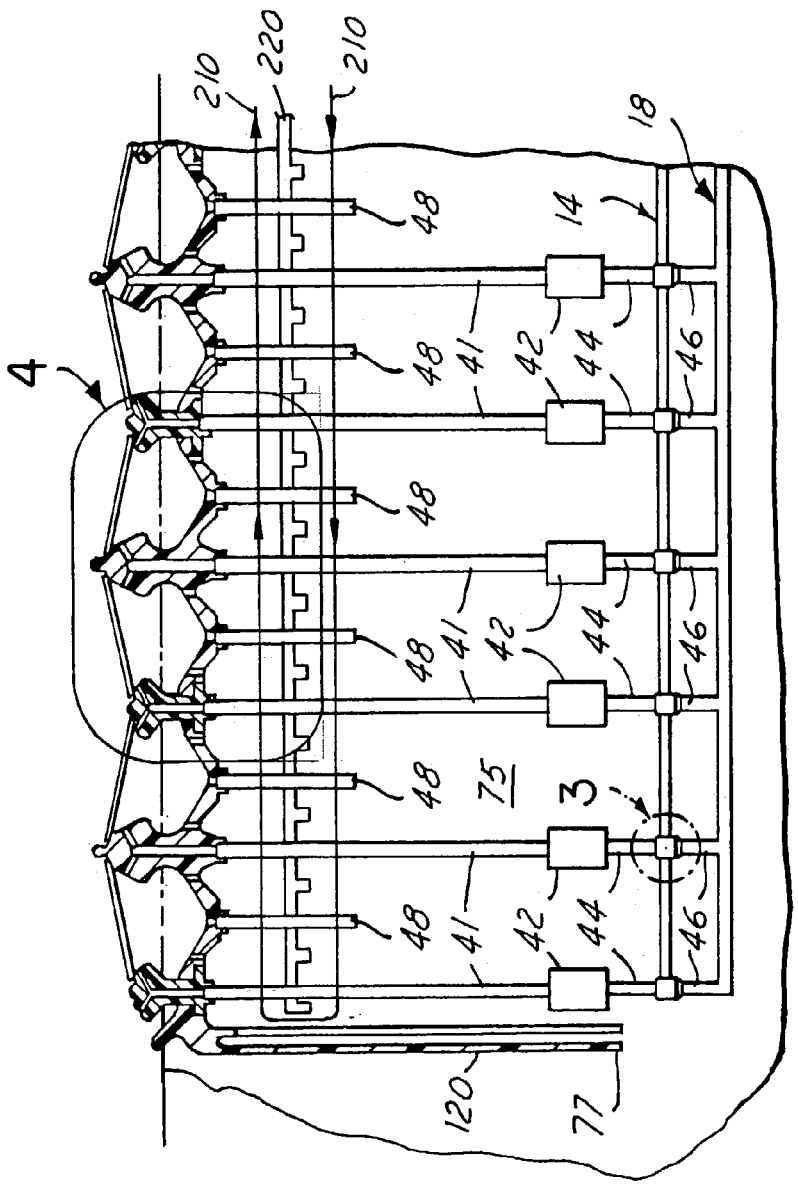
FIG. 2 is a view taken within the circle "2" of FIG. 1.
Figure 4:
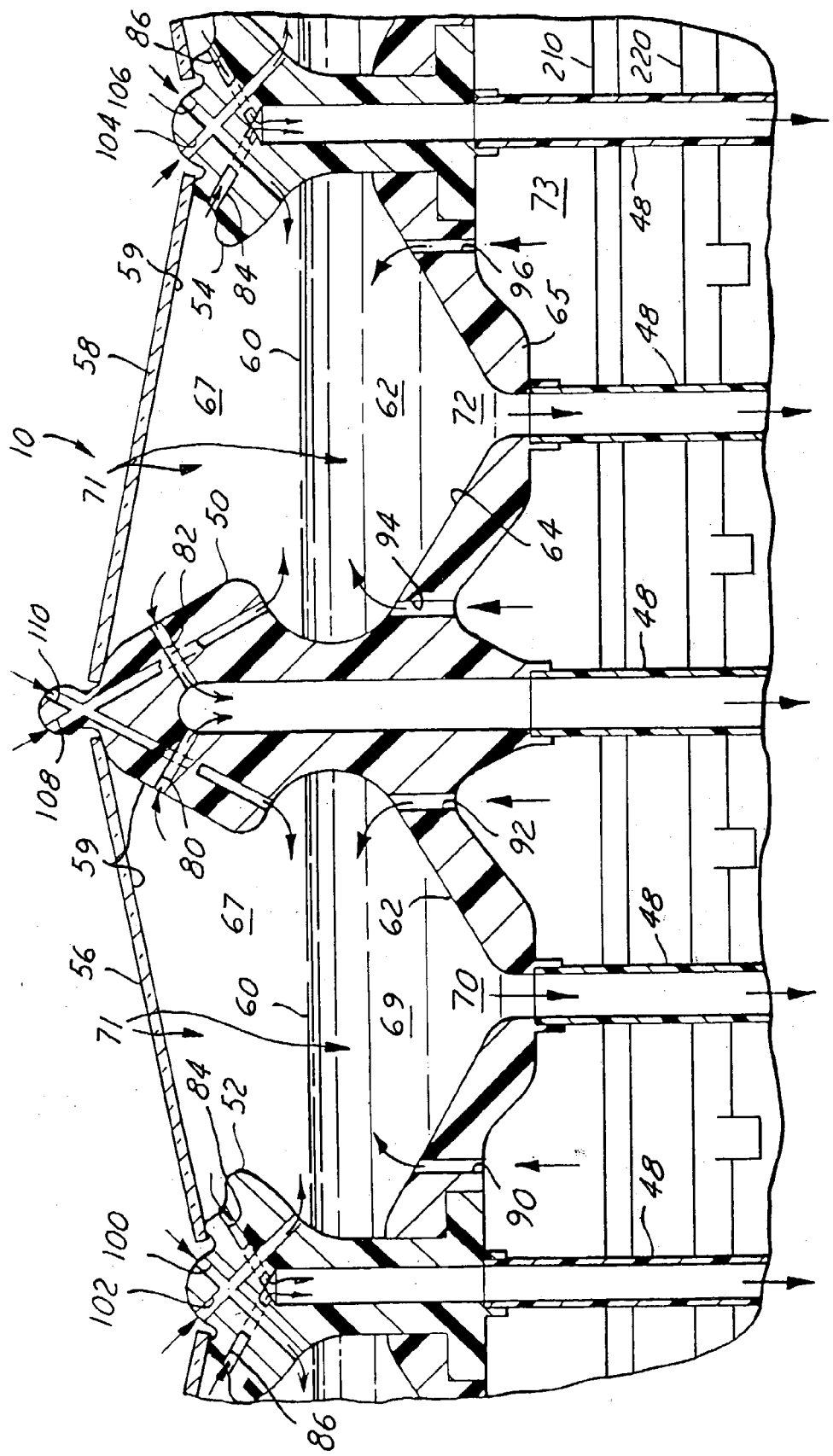
FIG. 4 is a cross-sectional view taken within the circle 4 of FIG. 2.

As seen in FIGS. 2 and 4, each solar cell 10 is made of insulating material, for example, polyurethane foam encapsulated by PVC or the like to preclude attack by salt water. Each cell 10 comprises a pair of cool water return pipes 48 extending downwardly relative to a central pedestal 50. A pair of side pedestals 52 and 54 are disposed on opposite sides of the central pedestal 50. The central pedestal 50, side pedestals 52 and 54, and base portions 62, 64 support a pair of solar energy transparent upper panels 56 and 58 to form an enclosure 59. The cool water return pipes 48 are connected to the base portions 62 and 64 of a pair of truncated conical funnel like water chambers 70 and 72 on opposite sides of the pedestal 50 which aid in the circulation of water from each cell 10 downwardly through the pipes 48 into the body of water underlying the cell 10. The base portions 62, 64 form a lower panel 65 positioned below the water surface 60. The solar energy transparent upper panels 56 and 58 and the lower panel 65 are positioned to define an airspace 67 and a cavity 69. The cavity 69 is filled with a portion of the body of salt water 12. The airspace 67 and cavity 69 define an inner cell heating zone 71 within the enclosure 59. This inner cell heating zone 71 serves to capture solar energy and store it within the solar energy conversion system 8.

In operation, when sunlight impinges on the cell 10, solar energy passes through the glass panels 56 and 58 so as to heat and evaporate the water inside the solar cell 10. The water vapor is then drawn through passages 80 and 82 in the pedestal 50, through the water vapor extraction pipes 40 to the condensers 42 due to the reduced pressure therein created by the vacuum pump or source 16. A pressure differential is maintained between ambient pressure externally of the cells 10 and water vapor pressure internally of the cells 10. This is accomplished by connecting a vacuum line 14 to each solar cell 10 and to the low pressure side of a vacuum pump or source 16. In addition, water vapor is drawn through passages 84 and 86 in each of the pedestals 52 and 54 through the water vapor extraction pipes 41 to the condensers 42 along with water that condenses on the lower face of the glass panels 56 and 58.

Figure 3:
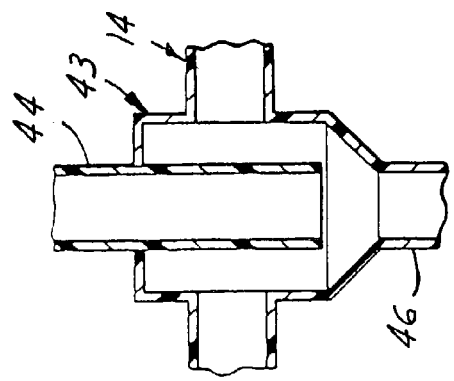
FIG. 3 is a cross-sectional view taken within the circle 3 of FIG. 2.

Each of the solar cells 10 is provided with downwardly extending water vapor extraction pipes 40 and 41 for the conduction of water vapor to a like plurality of condensers 42. As seen in FIG. 3, the condensate output side of each condenser 42 is connected to the vacuum line 14 by conduits 44. Condensate pipes 46 are also connected to the output side of each condenser 42 and extend downwardly from the vacuum line 14 for connection to the horizontally orientated fresh water extraction conduit 18. As water vapor moves down the vapor extraction pipes 40 and 41 under the influence of the vacuum pump or source 16, water continuously condenses in the pipes 40 and 41 as well as in condensers 42. Fresh or distilled water flows downwardly from the condenser 42 through a water/vapor separator 43 (see FIG. 3), thence through the fresh water conduits 46 and 18 to fresh water storage tanks 20. A service platform 22 can be orientated over the tanks 20 for the housing of the vacuum pump 16, fresh water pumps, valves, etc.

Heat generated by such condensation warms the water externally of the pipes 40 and 41 and condensers 42 creating an under cell heating zone 73 positioned below the enclosure 59. The under cell heating zone 73 is generated by transferring the solar energy stored in the inner cell heating zone 71 to a column of sea water 75 positioned below the enclosure 59. Although this transference has been described by way of condensation, it should be understood that the transference may be accomplished in a variety of fashions. The warmed sea water rises and finds its way through passages 90, 92, 94 and 96 (vertical salt water replenishment conduits) in the cell 10 thereafter rising to the water surface 60 where it is subjected to solar energy. When surface water in the cells 10 evaporates, the underlying water cools, causing it to sink through the pipes 48. This relatively cooler water (and saltier in the case of sea water) is replaced by warmer water from under the cell 10 which rises through passages 90–96. Water lost due to evaporation is replaced by the incoming relatively warm water through the passages 90–96.

It is to be noted that hot, moist ambient air can be drawn into the cell 10 through passages 100, 102, 104, 106, 108 and 110 so as to greatly increase efficiency of the solar cell 10. As the water vapor is drawn down the vapor extraction pipes 40 and 41 under the influence of the vacuum pump or source 16, a partial vacuum is created in the enclosure 59 that actively draws the ambient air into the cell 10 through passages 100, 102, 104, 106, 108 and 110. This in effect captures water vapor from surrounding body of water to further improve the efficiency of the present invention. The ambient moist air can retrieve rising heated water losses escaping from under the perimeter heat insulation barrier 120 as well as the vapor from naturally heated surrounding waters. Although the passages 100, 102, 104, 106, 108 and 110 may be formed in a variety of configurations, one embodiment contemplates directing the passages 100, 102, 104, 106, 108 and 110 at the surface of the portion of the body of water captured in the enclosure 59. This further helps draw the water vapor off the heated water 12 within the cavity 69 and improves the efficiency of the present invention.

As operation continues, heat will build up under the cell 10, bringing the upper film of water within the system 8 to an elevated temperature that facilitates evaporation of the sea water. Accordingly, it is essential to efficient operation of the system 8, that heat be retained within the system 8 by a perimeter heat insulator barrier 120 that extends downwardly to a level slightly above the condenser whereby relatively cool sea water surrounds the condensers 42. In this fashion, the perimeter heat insulation barrier 120 defines the under cell heating zone 73 below the enclosures. The under cell heating zone 73 having only a bottom face 77 open to the body of sea water 12. The under cell heating zone 73 is comprised of a column of sea water 75 positioned below the enclosure 59. The insulation barrier 120 surrounds only the sides of the column of sea water 75 while the bottom face 77 is open. The under cell heating zone 73 can store a mass of heated sea water 75. In the preferred embodiment, the barrier 120 is made of polyurethane or similar material covered with protective material such as PVC Savings.

Figure 5:
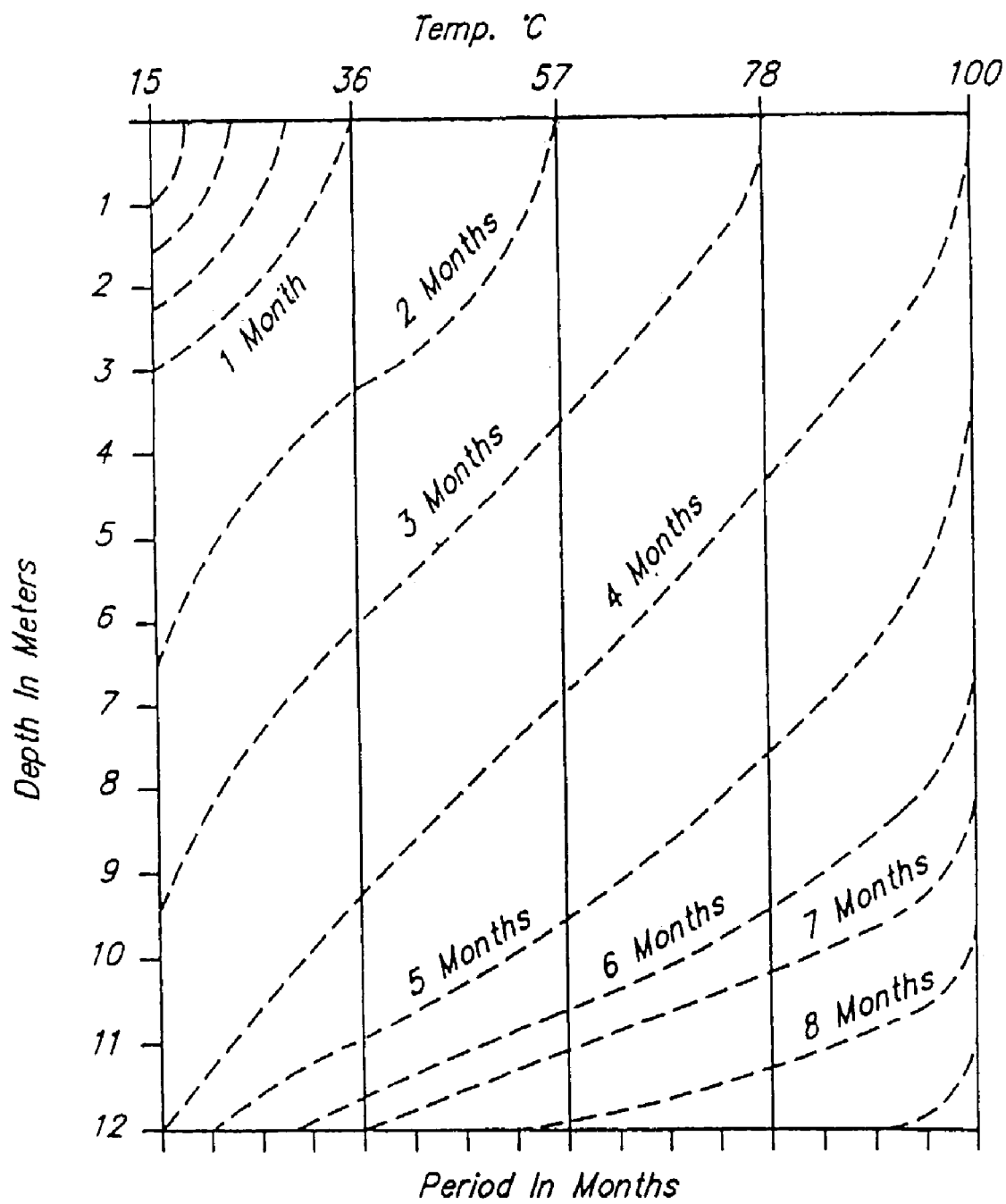
FIG. 5 is a graph showing heat gain in sea water in the disclosed system over time.

The under cell heating zone 73 can continuously increase in temperature when the solar energy conversion system 8 is utilized in warmer climates. In fact, it is contemplated that the present invention can be employed such that the entire column of sea water 75 positioned under the enclosure 59 can reach the boiling point of water (or salt water as the case may be). In approximately 9 months after the start of operation the column of water 75 can reach this condition. FIG. 5 illustrates the temperature of the column of water 75 over a period of nine months. Without use, the thermally charged water within the solar cell 10 would begin to spill out under the perimeter heat insulation barrier 120 and dissipated into the surrounding waters. The advantage of this system 8 is that this large quantity of highly solar charged water is directed towards a power generator 200 to generate electricity. It should be recognized that the solar energy stored in the column of water 75 need not represent the sole source of energy for feeding the power generator 200 but may simply be utilizing to impact the efficiency of the power generator 200.

Power generators 200 are known to come in a wide variety of forms and configurations. It is known, however, that whether such generators comprise steam turbines or ocean thermal energy conversion generators, many of these designs rely on heated water as a source of power to generate electricity. The present system creates significant inroads to such power generating systems by harnessing and trapping solar energy for use in these systems. Often power generators 200 may be sensitive to the content of water used to generate electricity. Biofouling or contamination may result in damage to the power generator 200 or a loss of efficiency. An embodiment of the present invention addresses this by including a fresh water heat exchanger 210 in communication with the fresh water conduit 18. Although the fresh water heat exchanger 210 may be placed in communication with the fresh water conduit 18 in a variety of fashions, one embodiment contemplates the communication taking place via the at least one fresh water storage tank 20 as illustrated in FIG. 1. In this fashion the fresh water heat exchanger 210 can draw a continuous flow from the stored fresh water.

The fresh water heat exchanger 210 is positioned within the solar cell 10 such that fresh water passing through the fresh water heat exchanger 210 is thermally enriched as it passes through the fresh water heat exchanger 210. The fresh water heat exchanger 210 preferably passes through the column of water 75 that has become superheated due to solar energy. A variety of heat exchangers may be utilized to facilitate the transference of the solar energy stored in the column of water 75 into the fresh water. Although the fresh water heat exchanger 210 is illustrated positioned within the column of water 75, ill other embodiments it is contemplated that it may be positioned in other locations within the solar cell 10. The fresh water heat exchanger 210 is contemplated to be in communication with the power generator 200 such that a supply of thermally enriched distilled water can be supplied to the power generator 200. This can be utilized to significantly improve the efficiency of the power generator 200.

It is recognized that not all power generators 200 or bodies of water 12 need or benefit from the use of a fresh water heat exchanger 210. In such circumstances, the present invention contemplates the use of a heated water supply conduit 220 in communication with the under cell heating zone 73. In one embodiment, the heated water supply conduit 220 may simply conduct the thermally enriched water 270 from the fresh water heat exchanger 210 to the power generator 200. In an embodiment wherein such fresh water usage is not beneficial, however, the heated water supply conduit 220 may conduct the thermally enriched water 270 directly from portions of the heated column of water 75. In such cases where the heated water supply conduit 220 directly transfers salt water, the power generator 200 output may additionally include distilled water 230 which further improves the benefits of the present system and a water discharge 235. In either case, the heated water supply conduit 220 is preferably insulated in areas outside of the under cell heating zone 73 to protect the integrity of the thermally enriched water 270.

In a unique embodiment of the present invention illustrated in FIG. 1, it is contemplated that the power generator 200 comprises an ocean thermal energy conversion generator 240. The OTEC generator 240 further includes a cold water conduit 250 in communication with the power generator. The cold water conduit 250 communicates chilled sea water 260 to the OTEC generator 240. The OTEC generator 240 in turn utilizes the chilled sea water 260 in combination with the thermally enriched water 270 provided by the heated water supply conduit 220 to generate electricity.

Commonly OTEC generators 240 require pipes from significant ocean depths to deliver chilled sea water 260. Even when these mechanical difficulties are hurdled, the temperature differential between the hot and cold waters in existing OTEC assemblies limits their potential. The present invention directly removes these limitations. The thermally enriched water 270 from the present invention is contemplated to approach 100 degrees Celsius (212 Fahrenheit). With this level of temperature on the hot side, the chilled sea water 260 need only be drawn from any reasonable depth (such as 60 feet deep) wherein the temperature is slightly chilled (15 degrees C. 59 degrees Fahrenheit). These temperature differences, therefore, of the present invention (upwards of 85 degrees C., 153 degrees Fahrenheit) will provide a differential vapor pressure significantly more that of present OTEC systems and a differential vapor weight well in excess of existing designs. This dramatically improves the efficiency of the OTEC generator 240 while simultaneously reducing the mechanical constraints of existing systems wherein the plant must be positioned significantly offshore. The energy utilized to generate a vacuum in an OTEC system can be significantly reduced simultaneously with the increase in power generation resultant from vapor pressure differences. Additionally, the extreme temperatures of the thermally enriched water 270 are known to reduce biofouling which is most prevalent between temperatures of 15 and 35 degrees Celsius. Thus fewer deposits are present in the presented energy conversion system 8 as compared to prior systems. This eliminates the need for filtering systems such as reverse osmosis filters that add cost to existing energy conversion systems.

While particular embodiments of the invention have been shown and described, numerous variations and alternative embodiments will occur to those skilled in the arm. Accordingly, it is intended that the invention be limited only in terms of the appended claims.

What is claimed is:

1. A solar thermal energy conversion system comprising:
  a floating solar cell for disposition on the surface of a body of water comprising:
  an enclosure having a solar energy transparent upper panel spaced upwardly from the surface of said water body so as to define an airspace thereabove, and a lower panel spaced below the surface of said water body so as to define a cavity filled with a portion of said body of water;
  an insulating wall on the periphery of said enclosure extending downwardly therefrom into said body of water to encompass a column of water positioned beneath said enclosure;
  a vertical water vapor conduit having an upper end communicating with the airspace in said enclosure and a lower end extending below said lower panel of said enclosure further into said body of water;

a vapor condenser, having a partial vacuum, connected to a lower end of said vapor conduit below a lower extremity of said insulating wall, said vapor condenser generating fresh water;

a fresh water conduit connected to a lower end of said condenser; and a vertical water replenishment conduit extending downwardly from said lower panel in said enclosure into said body of water internally of said insulating wall for conducting water heated by the heat of condensation in said condenser upwardly to the cavity of said enclosure;

a fresh water heat exchanger positioned within said solar cell, said fresh water heat exchanger in communication with said fresh water conduit such that said fresh water from said fresh water conduit is heated as it passes through said fresh water heat exchanger;

a power generator in communication with said fresh water heat exchanger, said power generator utilizing said heated fresh water for the generation of electricity.

2. A solar thermal energy conversion system in accordance with claim 1 wherein said fresh water heat exchanger is positioned within said column of water.

3. A solar thermal energy conversion system in accordance with claim 1 further comprising:

at least one freshwater storage tank in communication with said fresh water conduit, said fresh water heat exchanger in communication with said at least one freshwater storage tank to receive said fresh water from said fresh water conduit.

4. A solar thermal energy conversion system in accordance with claim 1 wherein said power generator comprises a steam turbine, said steam turbine utilizing said heated fresh water to generate electricity.

5. A solar thermal energy conversion system in accordance with claim 1 further comprising:

a cold sea water conduit positioned to receive chilled sea water from outside said enclosure, said cold water conduit in communication with said power generator.

6. A solar thermal energy conversion system in accordance with claim 5 wherein said power generator comprises an ocean thermal energy conversion generator, said ocean thermal energy conversion generator utilizing said heated fresh water in combination with said chilled sea water to generate electricity.

7. A solar thermal energy conversion system comprising:

a floating solar cell for disposition on the surface of a body of water comprising:

an inner cell heating zone defined by an enclosure having a solar energy transparent upper panel spaced upwardly from the surface of said body of water so as to define an airspace thereabove, and a lower panel spaced below the surface of said body of water so as to define a cavity filled with a portion of said body of water;

an under cell heating zone below said inner cell heating zone, said under cell heating zone defined by an insulating wall on the periphery of said enclosure extending downwardly therefrom into said body of water, said insulating wall having an open bottom face;

a vertical water vapor conduit having an upper end communicating with the air-space in said enclosure and a lower end extending through said under cell heating zone, said vertical water vapor conduit heating the portion of said body of water located within said under cell heating zone;

a vapor condenser having a partial vacuum, connected to a lower end of said vapor conduit below a lower extremity of said insulating wall, said vapor condenser positioned below said under cell heating zone such that portions of said body of water heated by said vapor condenser will rise into said under cell heating zone;

a vertical water replenishment conduit extending downwardly from said inner cell heating zone into said under cell heating zone for conducting heated water from said under cell heating zone upwardly into said inner cell heating zone;

a heated water supply conduit in communication with said under cell heating zone; and a power generator in communication with said heated water supply conduit, said heated water supply conduit transporting thermally enriched water from said under cell heating zone to said power generator.

8. A solar thermal energy conversion system in accordance with claim 7 wherein said thermally enriched water comprises said heated water from said under cell heating zone.

9. A solar thermal energy conversion system in accordance with claim 7 further comprising:

a fresh water collection conduit in communication with said vapor condenser;

a fresh water heat exchanger positioned within said enclosure, said fresh water heat exchanger in communication with said fresh water conduit such that fresh water from said fresh water conduit is heated as it passes through said fresh water heat exchanger, said thermally enriched water comprising said heated fresh water from said fresh water heat exchanger.

10. A solar thermal energy conversion system in accordance with claim 9 further comprising:

at least one freshwater storage tank in communication with said fresh water conduit, said fresh water heat exchanger in communication with said at least one freshwater storage tank to receive said fresh water from said fresh water conduit.

11. A solar thermal energy conversion system in accordance with claim 7 wherein said power generator comprises a steam turbine, said steam turbine utilizing said thermally enriched water to generate electricity.

12. A solar thermal energy conversion system in accordance with claim 7 further comprising:

a cold sea water conduit positioned to receive chilled sea water from outside said floating solar cell, said cold water conduit in communication with said power generator.

13. A solar thermal energy conversion system in accordance with claim 12 wherein said power generator comprises an ocean thermal energy conversion generator, said ocean thermal energy conversion generator utilizing said thermally enriched water in combination with said chilled sea water to generate electricity.

* * * * *